United States Patent Office 3,808,342
Patented Apr. 30, 1974

---

3,808,342
PROCESS FOR PREPARING A FROZEN FOOD PRODUCT
Axel Borje Brandin, Pully, Switzerland, assignor to Produits Findus S.A., Vevey, Switzerland
No Drawing. Filed Sept. 13, 1971, Ser. No. 180,177
Claims priority, application Great Britain, Sept. 15, 1970, 43,996/70
Int. Cl. A22c 18/00, 25/00
U.S. Cl. 426—164                6 Claims

ABSTRACT OF THE DISCLOSURE

A deep-frozen food product comprising a piece of meat or fish to at least one surface of which is applied a sauce in the form of a stable foam comprising 5 to 40 parts by weight of fat, 1 to 4 parts by weight of starch, 1 to 3 parts by weight of stabilizer and a substantially aqueous liquid in an amount such that in the sauce the weight ratio of solids (including fat) to liquid is between 3:1 and 1:3. The sauce may optionally contain an edible protein and/or solid pieces of a garnish. A process for preparing the product is also described.

---

This invention is concerned with a novel deep-frozen food product.

An object of the invention is to provide a food product comprising fish or meat and a sauce which is simple to prepare by the user.

Another object of the invention is to provide a sauce formulation which may be applied to pieces of meat or fish, the sauce on cooking providing an even coating and, if desired, depositing a garnish of solid material such as mushrooms, parsley, onions, peppers and the like.

According to the invention, a deep-frozen food product comprises a piece of meat or fish to at least one surface of which is applied a sauce in the form of a stable foam comprising 5 to 40 parts by weight of fat, 1 to 4 parts by weight of starch, 1 to 3 parts by weight of stabilizer and a substantially aqueous liquid in an amount such that in the sauce the weight ratio of solids (including fat) to liquid is between 3:1 and 1:3.

The piece of fish or meat, which for convenience will be referred to herein as the substrate, may be of any desired shape, but for practical reasons it is usually flat and preferably rectangular. For example, the substrate may be a fish fillet or a piece of fish about 2 cm. thick cut from a deep-frozen block. Alternatively, the substrate may be a slice of meat or meat loaf, either raw or cooked.

In preparing the product, the sauce foam is preferably applied to the substrate at a layer thickness of about 0.8 cm., so that the weight ratio of sauce to substrate is about 1 to 3. As soon as practical after applying the sauce, the product is deep-frozen, and it may be stored at temperatures of —18° C. or below. The substrate may be raw or cooked, and it may be frozen or at room temperature when the sauce is applied.

Aparat from the main ingredients, the sauce foam may also contain an edible protein such as milk solids, sodium caseinate or a protein isolate, the protein being selected having regard to its effect on the flavor of the final product. In general, the quantity of protein in the sauce will be between 5 and 10 parts by weight. Protein, as well as fat, may also be supplied in the form of cheese, especially when a meat loaf substrate is used. In addition, various flavorings and seasonings, including for example, salt, pepper, lemon juice, wine, coloring matter, and also pieces of a garnish such as parsley, peppers, onions, musorooms, capers and the like may be included in the sauce, depending on the flavour and appearance desired. The quantities of these various substances will be chosen having regard to the desired flavor.

Preferred stabilizers are the materials used in the production of ice-cream and deep-frozen "mousse" products which usually contain natural gums, alginates, carrageenans, pectin and similar substances, usually in combination with a phosphate which regulates the setting properties. Stabilizers should be selected which can provide a stable foam with an overrun of at least 15%, preferably 20 to 40%. Excessive overrun should, however, be avoided. The foam may be prepared by first melting the fat in warm water and incorporating the stabilizer and other ingredients, followed by cooling and whipping. The desired overrun may be obtained with a wire whip or, preferably, using a soft-serve ice-cream machine in which the liquid mix is cooled during whipping. In general, it is preferred to cool the mix prior to forming the foam, for example to a temperature below about 20° C. The stability of the foam increases on cooling, and hence it is convenient to cool the foam prior to its application to the substrate, as this facilitates extrusion of a ribbon of even thickness. It is thus advantageous to apply the foam to the substrate at temperatures not exceeding about 10° C.

A particular advantage of providing the sauce in the form of a foam lies in the fact that on cooking, as by heating in an oven, the sauce melts slowly leaving a layer on the top surface of the substrate which browns lightly giving a desired "glacé" effect. Furthermore, the slow melting feature makes it possible to incorporate pieces of garnish in the sauce which will remain on top of the product after cooking.

The frozen product is preferably packed for storage in a metal foil tray, in which it may be prepared directly by the consumer. The sauce will then be collected in the space between the piece of meat or fish and the side walls of the tray.

The invention is further illustrated by the following examples, in which all parts are by weight.

EXAMPLE 1

An emulsion is prepared from the following ingredients:

| | Parts |
|---|---|
| Margarine | 20 |
| Stabilizer [1] | 2.4 |
| Skimmed milk powder | 5 |
| White wine | 12 |
| Lemon juice | 4 |
| Carotene 1/100 in oil | 0.1 |
| Water | 25 |

[1] "Cremodan," a stabilizer for ice cream, manufacturing by Aktieselskabet Grindstedvaerket of Aarhus, Denmark.

The water is first heated to 40° C. to melt the margarine, the temperature is raised to 60° C., the stabilizer is added with stirring and the mixture is heated to 70° C. White wine and lemon juice are then added and the mix homogenized.

Separately, 15 parts of chopped onion are fried in 5 parts of margarine and 3 parts of parsley are added together with salt, pepper and seasonings. 2 parts of starch are added to this mix together with 25 parts of water and the mixture is heated to 90 to 95° C. with stirring.

The mix is combined with the homogenized emulsion, the mixture is cooled to about 15° C. and foamed with further cooling in a soft-serve ice cream machine. A foam having the following approximate composition is obtained:

| | Parts |
|---|---|
| Fat | 25 |
| Milk solids | 5 |
| Starch | 2 |
| Stabilizer | 2.4 |
| Choppped onions | 15 |
| Parsley | 3 |
| Seasonings | 3.3 |
| Coloring | Trace |
| Water [1] | 45 |

[1] Includes white wine and lemon juice.

The foam, having an overrun of about 30%, is extruded at about −8° C. onto the upper surface of a frozen block of fish about 2 cm. thick. The weight ratio of foam of fish is about 1 to 3, so that the sauce layer is about 0.8 cm. thick. The product is then deep-frozen.

For consumption, the product is heated in an oven for about 35 minutes, at a temperature of 20 to 230° C. On heating, the sauce melts slowly leaving pieces of onion and parsley on top of the fish, and a pleasant light-brown crust is formed.

EXAMPLE 2

Following the basic procedure described in Example 1, a series of sauces was prepared, the foam having the composition in parts shown in the following table:

TABLE

| | 1 | 2 | 3 | 4 | 5 |
|---|---|---|---|---|---|
| Fat | 5 | 20 | 5 | 40 | 30 |
| Milk solids | 7 | | 5 | 5 | |
| Starch | 3 | 3 | 4 | 2 | 2 |
| Stabilizer | 2 | 1.2 | 2.4 | 2.4 | 2 |
| Garnish | 18 | | 18 | 18 | |
| Seasonings | 3 | 3 | 3 | 3 | 3 |
| Water [1] | 35 | 50 | 42 | 30 | 65 |
| | Percent | | | | |
| Overrun | 30 | 40 | 20 | 20 | 25 |

[1] Includes wine and/or lemon juice.

Each sauce was applied to pieces of meat or fish and the products deep-frozen.

I claim:

1. A process for preparing a food product which comprises applying to an upper surface of a substantially flat substrate piece of one of fish and meat a sauce in the form of a layer of a stable foam, the sauce being at a temperature not exceeding about 10° C. and comprising 5 to 40 parts by weight of fat, 1 to 4 parts by weight of starch, 1 to 3 parts by weight of a foam stabilizer providing a foam overrun of at least 15% and a substantially aqueous liquid in an amount such that in the sauce the weight ratio of solids to liquid is between 3:1 and 1:3, and deep-freezing the product.

2. A process according to claim 1 in which the sauce also comprises an edible protein.

3. A process according to claim 1 in which the weight ratio of sauce to meat or fish is about 1 to 3.

4. A porcess according to claim 1 in which the sauce contains solid particles of a garnish.

5. A process according to claim 4 in which the foam has an overrun of 20 to 40%.

6. A deep-frozen food product package comprising a substantially flat frozen substrate piece of one of fish and meat having an upper surface to which has been applied an overlaying of a sauce in the form of a layer of a stable foam comprising 5 to 40 parts by weight of fat, 1 to 4 parts by weight of starch, 1 to 3 parts by weight of a foam stabilizer providing a foam overrun of at least 15% and a substantially aqueous liquid in an amount such that in the sauce the weight ratio of solids including fat to liquid is between 3:1 and 1:3, and a metal foil tray in which said substrate and overlaying layer of sauce are received, said tray having side walls, the frozen substrate piece being received in said tray that there is space between said substrate and the side walls.

References Cited

UNITED STATES PATENTS

| 3,483,004 | 12/1969 | Bauer | 99—111 |
| 1,193,739 | 9/1916 | Till | 99—144 |

HYMAN LORD, Primary Examiner

U.S. Cl. X.R.

426—203, 376, 382

UNITED STATES PATENT OFFICE
CERTIFICATE OF CORRECTION

Patent No. 3,808,342          Dated April 30, 1974

Inventor(s) Axel Borje Brandin

It is certified that error appears in the above-identified patent and that said Letters Patent are hereby corrected as shown below:

Column 3, line 28, "20" should read --220--.

Signed and sealed this 8th day of October 1974.

(SEAL)
Attest:

McCOY M. GIBSON JR.
Attesting Officer

C. MARSHALL DANN
Commissioner of Patents